United States Patent
Ke

(10) Patent No.: US 11,470,467 B2
(45) Date of Patent: Oct. 11, 2022

(54) CAPABILITY MANAGEMENT METHOD AND COMMUNICATIONS DEVICE

(71) Applicant: VIVO MOBILE COMMUNICATION CO.,LTD., Guangdong (CN)

(72) Inventor: Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/164,640

(22) Filed: Feb. 1, 2021

(65) Prior Publication Data
US 2021/0160685 A1 May 27, 2021

Related U.S. Application Data

(63) Continuation of application No. PCT/CN2019/098552, filed on Jul. 31, 2019.

(30) Foreign Application Priority Data

Aug. 1, 2018 (CN) .......................... 201810867220.2

(51) Int. Cl.
*H04W 8/24* (2009.01)
*H04W 8/20* (2009.01)
*H04W 72/04* (2009.01)

(52) U.S. Cl.
CPC ............. *H04W 8/24* (2013.01); *H04W 8/205* (2013.01); *H04W 72/048* (2013.01)

(58) Field of Classification Search
CPC ......... H04W 8/22; H04W 8/24; H04W 8/205; H04W 72/048

USPC ......................................................... 370/329
See application file for complete search history.

(56) References Cited

U.S. PATENT DOCUMENTS

| 10,757,566 | B2 | 8/2020 | He et al. |
| 10,779,158 | B2 | 9/2020 | Van Lieshout et al. |
| 10,887,927 | B2 * | 1/2021 | Wass ..................... H04W 76/12 |
| 2006/0223503 | A1 | 10/2006 | Muhonen et al. |
| 2012/0083309 | A1 * | 4/2012 | Kwon ..................... H04B 17/24 455/522 |
| 2016/0180062 | A1 * | 6/2016 | Evans ..................... G06F 21/10 726/28 |

(Continued)

FOREIGN PATENT DOCUMENTS

| CN | 101155068 A | 4/2008 |
| CN | 101155368 A | 4/2008 |

(Continued)

OTHER PUBLICATIONS

Extended European Search Report dated Jul. 21, 2021 as received in Application No. 19845248.4.

(Continued)

*Primary Examiner* — Congvan Tran
(74) *Attorney, Agent, or Firm* — Maschoff Brennan

(57) ABSTRACT

Provided are a capability management method and a communication device. The method is applied in a first communications device, and comprises: receiving information of a request for a terminal capability, the information containing first indication information indicating a requested terminal capability; and transmitting first related information associated with the terminal capability according to the first indication information.

11 Claims, 5 Drawing Sheets

(56) References Cited

U.S. PATENT DOCUMENTS

| | | | | |
|---|---|---|---|---|
| 2017/0357534 A1* | 12/2017 | Gupta | .................... | G06F 9/4881 |
| 2018/0262905 A1* | 9/2018 | Dhanapal | ................ | H04W 8/24 |
| 2019/0013024 A1* | 1/2019 | Jeon | ........................ | G10L 15/16 |
| 2021/0029618 A1* | 1/2021 | Jain | ....................... | H04W 48/04 |

FOREIGN PATENT DOCUMENTS

| | | | | | |
|---|---|---|---|---|---|
| CN | 101489218 | A | | 7/2009 | |
| CN | 106792468 | A | * | 5/2017 | ........... H04L 67/146 |
| CN | 107231623 | A | | 10/2017 | |
| CN | 108260121 | A | | 7/2018 | |
| EP | 3 335 450 | A1 | | 6/2018 | |
| EP | 3 342 095 | A1 | | 7/2018 | |
| WO | 2014055216 | A1 | | 4/2014 | |
| WO | 2015/142278 | A1 | | 9/2015 | |
| WO | 2017027057 | A | | 2/2017 | |
| WO | 2017052346 | A1 | | 3/2017 | |
| WO | 2017/078580 | A1 | | 5/2017 | |
| WO | 2018/031846 | A1 | | 2/2018 | |
| WO | 2018/165317 | A1 | | 9/2018 | |
| WO | 2019/195456 | A1 | | 10/2019 | |

OTHER PUBLICATIONS

Written Opinion and International Search Reported dated Feb. 11, 2021 as received in application No. PCT/CN2019/098552.
Chinese Office Action dated Sep. 17, 2020 as received in application No. 201810867220.2.
"UE Capability Compression" 3GPP TSG-RAN WG2 #101Bis, Tdoc R2-1805455, Sanya, P.R. of China, Apr. 16-20, 2018. Ericsson.
"UE Capability ID based UE capability transfer" 3GPP TSG-RAN WG2 NR meeting #102, R2-1807381, Busan, South Korea, May 21-May 25, 2018. Intel Corporation.
"Discussion on UE ID based capability reporting" 3GPP TSG-RAN WG2 Meeting#102, R2-1808265, Busan, Korea, May 21-25, 2018. Huawei, HiSilicon.
"UE Capability "Compression"" 3GPP TSG-RAN WG2#AH1807, Tdoc R2-1809959, Montreal, Canada, Jul. 2-6, 2018. Ericsson.
"Discussion on UE capability signaling optimization scheme for NR SA" 3GPP TSG RAN meeting #79, RP-180438, Chennai, India, Mar. 19-22, 2018. Intel Corporation.
Japanese Office Action dated Feb. 28, 2022 as received in application No. 2021-505237.

* cited by examiner

CAPABILITY MANAGEMENT METHOD AND COMMUNICATIONS DEVICE

CROSS REFERENCE

This application is a continuation application of PCT Application No. PCT/CN2019/098552 filed on Jul. 31, 2019, which claims priority to Chinese Patent Application No. 201810867220.2 filed in China on Aug. 1, 2018, which is incorporated herein by reference in its entirety.

TECHNICAL FIELD

Embodiments of the present disclosure relate to the field of communications technologies, and in particular, to a capability management method and a communications device.

BACKGROUND

With the evolution of a network system, a terminal needs to support more and more capabilities. In order to be effectively synchronized with a network side device, the terminal needs to send more and more capabilities to a network, resulting in increasingly large air interface load caused by capability sending.

However, there is no definite conclusion on how to reduce overheads caused by terminal capability sending.

SUMMARY

The present disclosure is implemented as follows:

According to a first aspect, an embodiment of the present disclosure provides a capability management method, which is applied to a first communications device, and includes:

receiving terminal capability request information, where the terminal capability request information includes first indication information used to indicate a requested terminal capability; and sending first related information of the terminal capability according to the first indication information.

According to a second aspect, an embodiment of the present disclosure provides a capability management method, which is applied to a second communications device, and includes:

obtaining first information, where the first information includes first capability identifier information; and sending terminal capability request information based on the first capability identifier information, where the terminal capability request information includes first indication information used to indicate a requested terminal capability.

According to a third aspect, an embodiment of the present disclosure provides a capability management method, which is applied to a third communications device, and includes:

sending second information, where the second information includes one of fourth capability identifier information and fifth capability identifier information; where the fourth capability identifier information has a mapped terminal capability, and the fifth capability identifier information has no mapped terminal capability.

According to a fourth aspect, an embodiment of the present disclosure provides a capability management method, which is applied to a fourth communications device, and includes:

obtaining second information, where the second information includes one of fourth capability identifier information and fifth capability identifier information; and sending second related information of a terminal capability based on the second information; where the fourth capability identifier information has a mapped terminal capability, and the fifth capability identifier information has no mapped terminal capability.

According to a fifth aspect, an embodiment of the present disclosure further provides a first communications device, including:

a first receiving module, configured to receive terminal capability request information, where the terminal capability request information includes first indication information used to indicate a requested terminal capability; and a first sending module, configured to send first related information of the terminal capability according to the first indication information.

According to a sixth aspect, an embodiment of the present disclosure further provides a second communications device, including:

a first obtaining module, configured to obtain first information, where the first information includes first capability identifier information; and a second sending module, configured to send terminal capability request information based on the first capability identifier information, where the terminal capability request information includes first indication information used to indicate a requested terminal capability.

According to a seventh aspect, an embodiment of the present disclosure further provides a third communications device, including:

a third sending module, configured to send second information, where the second information includes one of fourth capability identifier information and fifth capability identifier information; where the fourth capability identifier information has a mapped terminal capability, and the fifth capability identifier information has no mapped terminal capability.

According to an eighth aspect, an embodiment of the present disclosure further provides a fourth communications device, including:

a second obtaining module, configured to obtain second information, where the second information includes one of fourth capability identifier information and fifth capability identifier information; and a fourth sending module, configured to send second related information of a terminal capability based on the second information; where the fourth capability identifier information has a mapped terminal capability, and the fifth capability identifier information has no mapped terminal capability.

According to a ninth aspect, an embodiment of the present disclosure further provides a communications device, where the communications device includes a processor, a memory, and a computer program that is stored on the memory and that can run on the processor, and when the computer program is executed by the processor, steps of the capability management method according to the first aspect are implemented, or steps of the capability management method according to the second aspect are implemented, or steps of the capability management method according to the third aspect are implemented, or steps of the capability management method according to the fourth aspect are implemented.

According to a tenth aspect, an embodiment of the present disclosure further provides a computer-readable storage medium, where the computer-readable storage medium stores a computer program, and when the computer program is executed by a processor, steps of the capability management method according to the first aspect are implemented, or steps of the capability management method according to the second aspect are implemented, or steps of the capability management method according to the third aspect are implemented, or steps of the capability management method according to the fourth aspect are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

Figure 1:
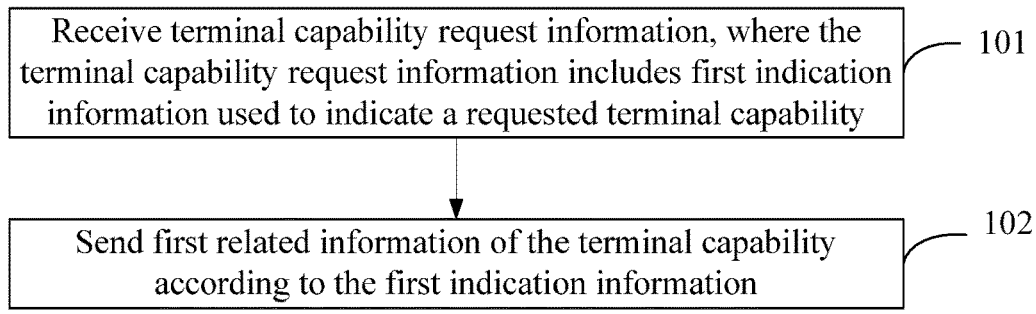
FIG. 1 is a flowchart 1 of a capability management method according to an embodiment of the present disclosure.

To reduce overheads caused by terminal capability sending, in the embodiments of the present disclosure, information capable of indicating a terminal capability may be set. The information capable of indicating the terminal capability may be referred to as terminal capability indication information, and the terminal capability indication information may be terminal capability identifier information indicating the terminal capability. In other words, there is a one-to-one mapping relationship between the terminal capability identifier information and the terminal capability.

In this way, a terminal can send only the identifier information indicating the terminal capability to a network side device, and the network side device can obtain the terminal capability by performing mapping by using the identifier information indicating the terminal capability, so that terminal capability sending overheads can be reduced compared with a case in which the terminal needs to send the terminal capability.

However, it is not clear how the network side device obtains the terminal capability. One method is to obtain the terminal capability through OAM (operation administration and maintenance) configuration. However, there are at least the following problems if the terminal capability is obtained through OAM configuration:

Problem 1: At least hundreds of terminal models are produced worldwide every year. For the same terminal model, the terminal may derive a plurality of terminal capabilities according to different operator networks, primary and secondary cards, and the like. Consequently, cumbersome OAM background configuration is caused, and it is prone to a configuration error. Once the configuration error occurs, the terminal cannot access a network.

Problem 2: For a terminal roaming from other countries, an operator cannot obtain capability information of the terminal in advance at the background.

Therefore, how to effectively and accurately obtain and manage the terminal capability while reducing the terminal capability sending overheads is a problem to be resolved by the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in this application, "and/or" is used to indicate at least one of connected objects, for example, A and/or B and/or C indicates seven cases: only A, only B, only C, both A and B, both B and C, both A and C, and A, B and C.

For ease of description, some content involved in the embodiments of the present disclosure is described below:

1. Terminal capability identifier information (which may be referred to as capability identifier information for short)

The terminal capability identifier information may be used to identify a terminal capability.

In the embodiments of the present disclosure, there is a mapping relationship between the terminal capability identifier information and the terminal capability, so that the terminal capability can be mapped by using the terminal capability identifier information. Specifically, the terminal capability identifier information may be mapped to a set of terminal capabilities or terminal capabilities of terminals. Because a size of the terminal capability identifier information is smaller than a size of the terminal capability, compared with sending the terminal capability, an optimized effect of saving capability signaling can be achieved if the terminal capability identifier information is sent.

It should be understood that both the terminal and the network side device may obtain the mapping relationship between the terminal capability identifier information and the terminal capability in advance. In actual application, the mapping relationship may be predefined in a protocol, so that both the terminal and the network side device can read the mapping relationship from the protocol. Certainly, in some implementations, the mapping relationship may be generated by the terminal in advance and sent to the network side device. This may be specifically determined according to actual needs, and is not limited in the embodiments of the present disclosure.

One terminal may have one or more pieces of terminal capability identifier information.

The terminal capability identifier information may include at least one of the following: manufacturer information of the terminal, model information of the terminal, software version information of the terminal, capability indication auxiliary information (or referred to as supplementary information), type information of a capability identifier, an identifier of the terminal capability, and a shortening value generated by using a hash function.

In an implementation, the terminal capability identifier information is an abstract terminal capability identifier. The capability identifier may include at least one of the following: manufacturer information of the terminal and type information of the terminal capability identifier.

In another implementation, the terminal capability identifier information includes model information of the terminal, manufacturer information, and capability indication auxiliary information.

The model information of the terminal may include at least one of the following:

TAC (Type Allocation Code), which is code used to identify a terminal brand and model, where the TAC can uniquely identify a same terminal model, and terminal capabilities of the same terminal model are usually the same; and an SVN (Software Version Number), which is used to distinguish different software versions used when mobile phones of the same model are delivered from the factory, where different SVNs may correspond to different terminal capabilities.

The capability indication auxiliary information may include at least one of the following: primary and secondary card indication information, network identifier information, and network type information.

The primary and secondary card indication information is used to indicate whether a current UICC (Universal Integrated Circuit Card) is inserted into a primary card slot or a secondary card slot. Specifically, the primary and secondary card indication information includes one of the following: primary card indication information and secondary card indication information.

It is not difficult to understand that, by using the primary and secondary card indication information, the network side device may map terminal capabilities corresponding to the terminal respectively on a primary card and a secondary card.

The network identifier information may indicate a network currently accessed by the terminal and/or a network access policy. For example, the network identifier information may be a PLMN (Public Land Mobile Network) identifier, but is not limited thereto.

It is not difficult to understand that, by using the network identifier information, the network side device may map terminal capabilities respectively corresponding to the terminal in different networks, and/or terminal capabilities respectively corresponding to the terminal when the terminal accesses a network by using different network access policies. Example descriptions are as follows:

For a same terminal, terminal capabilities may be different when the terminal roams to and accesses a home network.

For different terminals of the same model that access a same network, one roams to the network, one accesses a home network, but terminal capabilities may be the same.

A radio access network is shared by a plurality of operator networks. The radio access network knows, based on the network identifier information, a capability of a network to be accessed by the terminal.

Equivalent networks are correspondingly mapped to different terminal capabilities when PLMN information of the terminal changes.

The network type information may be used to indicate a network type capability currently enabled by the terminal or to indicate a network type capability disabled by the terminal.

It is not difficult to understand that, by using the network type information, the network side device may map terminal capabilities of the terminal in different network types. For example, for different terminals of the same model, one terminal is data centric (data centric), and can enable a 5G network capability when accessing 4G network, and another terminal is voice centric (voice centric), and the 5G network capability can be disabled because a 5G network does not support voice.

One terminal may have one or more pieces of terminal capability identifier information.

In an embodiment of the present disclosure, the terminal capability may include at least one of the following: a terminal core network capability and a terminal radio capability. The terminal core network capability may also be referred to as a terminal network capability, a non-access network (NAS) capability.

Optionally, the terminal radio capability may include at least one of the following: a carrier aggregation CA capability and a dual connectivity DC capability.

Optionally, the terminal core network capability may include at least one of the following: a 5G session management capability, a 5G mobility management capability, a user equipment network capability (UE Network capability), a mobile station network capability (MS Network capability), and the like.

Optionally, the terminal core network capability may include at least one of the following: a 5G network capability, a 4G network capability (for example, UE Network capability), a 3G network capability (for example, MS Network capability), and the like.

In this embodiment of the present disclosure, a service network is a network that provides access for the terminal, and may be a network of an operator or a dedicated network, or may be a public communication network or a private communication network. Optionally, an identifier of the service network may be a PLMN or the like (for example, an identifier configured by the private communication network itself).

In this embodiment of the present disclosure, the network type may include but is not limited to at least one of the following: a communication network type, a type of a radio access technology, a type of a radio access network, and a network age.

Optionally, the communication network type may include but is not limited to at least one of the following: GSM, EDGE, GPRS, GSM-CS, GSM-PS, CS, PS, CDMA, 3GPP2 1×CS, EPS, and 5GS.

Optionally, the type of the radio access technology may include but is not limited to at least one of the following: GERAN, GERAN-CS, GERAN-PS, EDGE, UTRA, TD-SCDMA, WCDMA, HSPA, CDMA, CDMA 2000, 3GPP2 1×CS, cdma2000-1×RTT, EUTRA, LTE FDD, LTE TDD, 3GPP, N3GPP, 3GPP2, WLAN, NB IOT, NG RAN, EUTRA-NR, and NR.

Optionally, the type of the radio access network may include but is not limited to at least one of the following: GERAN, GERAN-CS, GERAN-PS, EDGE, UTRAN, TD-SCDMA, WCDMA, HSPA, CDMA, CDMA 2000, 3GPP2 1×CS, cdma2000-1×RTT, EUTRAN, LTE FDD, LTE TDD, 3GPP, N3GPP, 3GPP2, WLAN, NB IOT, NG RAN, EUTRA-NR, and NR.

In the embodiments of the present disclosure, "capability" and "terminal capability" may indicate the same meaning, and may be mixed.

In the embodiments of the present disclosure, "capability identifier information," "terminal capability identifier information", and "identifier information of the terminal capability" may indicate the same meaning, and may be mixed.

In the embodiment of the present disclosure, "card" may be but is not limited to one of the following: a UICC, a SIM (Subscriber Identity Module), an eSIM, and an eUICC. The card may be a physical card. Further, an Nth card may represent placing a card of the service network in an Nth card slot. The primary card may indicate that the card of the service network is placed in the primary card slot, and the secondary card may indicate that the card of the service network is placed in the secondary card slot. Card location information may also be referred to as card slot information.

The card may be alternatively an electronic card. The service network may configure a plurality of cards for the terminal.

In the embodiments of the present disclosure, application range information of the identifier information of the terminal capability may be embodied as at least one of the following: application condition information of the identifier information of the terminal capability and type information of the identifier information of the terminal capability.

The type of the capability identifier may include at least one of the following: a primary and secondary card indicator, a network identifier (for example, a PLMN identifier), and a network type. In an implementation, the type of the capability identifier may be a combination of one or more of the foregoing.

The capability further includes a frequency band capability, a CA (Carrier Aggregation) capability, and a DC (Dual Connectivity) capability. In an implementation, only the DC capability and the CA capability need to be simplified because they are strong.

2. Service Network

The service network is a network that provides access for the terminal, and may be a network of an operator or a dedicated network. The service network may be a public communication network or a private communication network.

An identifier of the service network may be a PLMN or the like, for example, an identifier configured by the private communication network itself.

In the embodiments of the present disclosure, obtaining may be understood as obtaining from a configuration, obtaining through receiving, obtaining through receiving after a request, or obtaining after processing based on received information, and may be specifically determined according to actual needs. This is not limited in the embodiments of the present disclosure.

3. Architecture

A centralized CMF (Capability Management Function) network element may be defined. The CMF may be disposed together with an AMF, or may be disposed together with OAM, or may be a separate unit.

4. Communications Device

The communications device may be one of the following: a terminal, a physical device, a network function, and a network unit.

In the embodiments of the present disclosure, the communications device may include at least one of the following: a terminal, a core network element (CN network element for short), and a radio access network element (RAN network element for short).

In the embodiments of the present disclosure, the CN network element may include but is not limited to at least one of the following: a core network device, a core network node, a core network function, a core network unit, a mobility management entity (Mobility Management Entity, MME), an access management function (Access Management Function, AMF), a session management function (Session Management Function, SMF), a user plane function (User Plane Function, UPF), a serving gateway (serving GW, SGW), a PDN gateway (PDN Gateway, PDN gateway), a policy control function (Policy Control Function, PCF), a policy and charging rules function (Policy and Charging Rules Function, PCRF) unit, a serving GPRS support node (Serving GPRS Support Node, SGSN), a gateway GPRS support node (Gateway GPRS Support Node, GGSN).

In the embodiments of the present disclosure, the RAN network element may include but is not limited to at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved NodeB (evolved NodeB, eNB), a 5G base station (gNB), a radio network controller (Radio Network Controller, RNC), a NodeB (NodeB), a non-3GPP interworking function (Non-3GPP Inter Working Function, N3IWF), an access control (Access Controller, AC) node, an access point (Access Point, AP) device, and a wireless local area network (Wireless Local Area Networks, WLAN) node.

The base station may be a base transceiver station (BTS, Base Transceiver Station) in GSM or CDMA, or may be a NodeB (NodeB) in WCDMA, or may be an evolved NodeB (eNB or e-NodeB) and a 5G base station (gNB) in LTE. This is not limited in the embodiments of the present disclosure.

In the embodiments of the present disclosure, the terminal may be referred to as UE (User Equipment, user equipment), and may be specifically a mobile phone, a tablet personal computer (Tablet Personal Computer), a laptop computer (Laptop Computer), a personal digital assistant (personal digital assistant, PDA for short), a mobile internet device (Mobile Internet Device, MID), a wearable device (Wearable Device), or the like.

In addition, the terminal may further include a relay that supports a function of the terminal.

The following describes the capability management method in the embodiments of the present disclosure.

In the embodiments of the present disclosure, a manner of sending the terminal capability may include active sending and passive sending. The active sending may be embodied as follows: The terminal may actively send the capability to the network side device when the capability changes. The passive sending may be embodied as follows: After receiving a request from the network side device, the terminal sends related information about a requested terminal capability.

FIG. 1 is a flowchart 1 of a capability management method according to an embodiment of the present disclosure. The capability management method in this embodiment is applied to a first communications device, and the first communications device may include but is not limited to at least one of the following: a terminal, a relay having a terminal capability, a RAN network element, and a CN network element.

As shown in FIG. 1, the capability management method in this embodiment may include the following steps.

Step 101: Receive terminal capability request information, where the terminal capability request information includes first indication information used to indicate a requested terminal capability.

In specific implementation, the receiving terminal capability request information may be: receiving terminal capability request information sent by a first target end.

The first target end may include at least one of the following: a RAN network element, a CN network element, and a relay.

In an implementation, if the first communications device is a terminal, the first target end may be at least one of the following: a CN network element, a RAN network element, and a relay. If the first communications device is a relay, the first target end may be at least one of the following: a CN network element and a RAN network element. If the first communications device is a CN network element, the first target end may be at least one of the following: a terminal, a relay, and a RAN network element. If the first communications device is a RAN network element, the first target end may be at least one of the following: a terminal, a relay, and a CN network element.

In this step, the first indication information in the terminal capability request message may explicitly (or directly) or implicitly (or indirectly) indicate a terminal capability requested by the first target end. In this way, the first communications device may directly obtain or indirectly derive, based on a specific representation of the first indication information, first related information of the terminal capability that needs to be sent.

Optionally, the first indication information may include at least one of the following: first capability identifier information, second capability identifier information, third capability identifier information, second indication information used to indicate that there is no terminal capability information, and a null value used to indicate that there is no terminal capability information.

The second capability identifier information is capability identifier information with no mapped terminal capability in the first capability identifier information, and the third capability identifier information is capability identifier information with a mapped terminal capability in the first capability identifier information.

In an implementation, the first capability identifier information may include one piece of terminal capability identifier information or a plurality of pieces of terminal capability identifier information. A first capability identifier may not have a mapped terminal capability on a network side network element.

In another implementation, the first capability identifier information includes a plurality of capability identifiers. Some capability identifiers may not have a mapped terminal capability on a network side. In this embodiment of the present disclosure, some capability identifiers with no mapped terminal capability may be referred to as second capability identifier information, and some capability identifiers with mapped terminal capabilities may be referred to as third capability identifier information. In other words, in a mapping relationship (or referred to as a mapping library) between the capability identifier information of the first target end and the terminal capability, a second capability identifier included in the first capability identifier information has no mapped terminal capability, and a third capability identifier included in the first capability identifier information has a mapped terminal capability.

In addition, the second indication information may be used to indicate that the first target end has no terminal capability information. The null value may be used to indicate that the first target end has no terminal capability information.

Further, the terminal capability information may include at least one of the following: capability identifier information and the terminal capability. In an implementation, the terminal capability is a terminal capability mapped in a same manner as the capability identifier information. In other words, if the terminal capability request message includes the null value or the second indication information, it indicates that the mapping relationship that is between the capability identifier information and the terminal capability and that is stored on the first target end does not have the terminal capability and/or capability identifier information of the terminal.

Step 102: Send first related information of the terminal capability according to the first indication information.

In this step, the first communications device may determine, according to the first indication information, the terminal capability requested by the first target end, and send, to the first target end, the terminal capability requested by the first target end, that is, the first related information of the terminal capability described in this step.

Optionally, the first related information of the terminal capability includes at least one of the following: a terminal capability to which the first capability identifier information is mapped, a terminal capability to which the second capability identifier information is mapped, and a terminal capability of a terminal. Specifically, the terminal capability of the terminal may be a complete terminal capability of the terminal. The terminal capability of the terminal may be a terminal capability to which the capability identifier information of the terminal is mapped.

Further, the first related information of the terminal capability further includes at least one of the following: the first capability identifier information, the second capability identifier information, and capability identifier information to which the terminal capability of the terminal is mapped.

It should be understood that the capability identifier information included in the first related information of the terminal capability may be capability identifier information that is included in the first related information of the terminal capability and to which the terminal capability is mapped.

Specifically, if the first related information of the terminal capability includes the terminal capability to which the first capability identifier information is mapped, the first related information of the terminal capability may further include the first capability identifier information.

If the first related information of the terminal capability includes the terminal capability to which the second capability identifier information is mapped, the first related information of the terminal capability may further include the second capability identifier information.

If the first related information of the terminal capability includes the terminal capability of the terminal, the first related information of the terminal capability may further include the capability identifier information to which the terminal capability of the terminal is mapped.

In this way, because the first related information of the terminal capability includes the capability identifier information and the terminal capability to which the capability identifier information is mapped, after receiving the first related information of the terminal capability, the first target end may quickly update a mapping relationship between the capability identifier information and the terminal capability, thereby improving an update rate of the mapping relationship.

It should be understood that content included in the first related information of the terminal capability corresponds to a specific representation manner of the first indication information.

Optionally, when the first indication information includes the first capability identifier information, the first related information of the terminal capability includes at least one of the following: a terminal capability to which the first capability identifier information is mapped and the first capability identifier information; and/or when the first indication information includes the first capability identifier information and the third capability identifier information, and/or the first indication information includes the second capability identifier information, and/or the indication information includes the third capability identifier information, the first related information of the terminal capability includes at least a terminal capability to which the second capability identifier information is mapped and the second capability identifier information; and/or when the first indication information includes the null value and/or the second indication information, the first related information of the terminal capability includes at least one of the following: a terminal capability of a terminal, capability identifier information to which the terminal capability of the terminal is mapped, the first capability identifier information, and a terminal capability to which the first capability identifier information is mapped.

The following describes specific implementations of different scenarios.

Scenario 1: The first target end determines that the mapping relationship that is between the capability identifier information and the terminal capability and that is stored on the first target end does not have the terminal capability to which the first capability identifier information is mapped.

In this scenario, the first target end may add the first capability identifier information to the terminal capability request information. In this way, after receiving the foregoing terminal capability request information, the first communications device may add, to the first related information of the terminal capability, at least the terminal capability to which the first capability identifier information is mapped, to update the mapping relationship between the capability identifier information and the terminal capability.

Scenario 2: The first target end determines that the mapping relationship that is between the capability identifier information and the terminal capability and that is stored on the first target end does not have the terminal capability to which the second capability identifier information is mapped, but has a terminal capability to which the third capability identifier information is mapped. The second capability identifier information and the third capability identifier information belong to the first capability identifier information.

In this scenario, the first target end may request, in an explicit or implicit manner, the first communications device to send the terminal capability to which the second capability identifier information is mapped.

In an implicit request manner, the first target end may add the first capability identifier information and the third capability identifier information to the terminal capability request information. In this way, after receiving the foregoing terminal capability request information, the first communications device may derive, based on the first capability identifier information and the third capability identifier information that are carried in the terminal capability request information, that the mapping relationship that is between the capability identifier information and the terminal capability and that is stored on the first target end does not have the terminal capability to which the second capability identifier information is mapped, so that the terminal capability to which the second capability identifier information is mapped may be carried at least in the first related information of the terminal capability.

It should be noted that in this embodiment, the first capability identifier information is capability identifier information sent by the first communications device to the first target end. Therefore, in some implementations, the first target end may add only the third capability identifier information to the terminal capability request information. In this way, after receiving the foregoing terminal capability request information, the first communications device may derive, based on the third capability identifier information and the first capability identifier information that are carried in the terminal capability request information, that the mapping relationship that is between the capability identifier information and the terminal capability and that is stored on the first target end does not have the terminal capability to which the second capability identifier information is mapped, so that the terminal capability to which the second capability identifier information is mapped may be carried at least in the first related information of the terminal capability. In this way, content carried in the terminal capability request information can be reduced, and signaling overheads can be reduced.

In the explicit request manner, the first target end may directly add the second capability identifier information to the terminal capability request information. In this way, after receiving the foregoing terminal capability request information, the first communications device may directly learn that the mapping relationship that is between the capability identifier information and the terminal capability and that is stored on the first target end does not have the terminal capability to which the second capability identifier information is mapped, and does not need to perform derivation, so that the first related information of the terminal capability carries the terminal capability to which the first capability identifier information is mapped. It can be learned that, compared with the implicit request manner, explicit requesting can shorten a processing process of the first communications device and reduce a running load.

In actual application, before sending the terminal capability request message, the first target end may pre-determine a quantity of capability identifiers included in the second capability identifier information and a quantity of capability identifiers included in the third capability identifier information, and determine, based on the quantity of capability identifiers included in the second capability identifier information and the quantity of capability identifiers the third capability identifier information, to use the implicit request manner or the explicit request manner.

Specifically, if the quantity of capability identifiers included in the second capability identifier information is greater than the quantity of capability identifiers included in the third capability identifier information, the second capability identifier information is carried in the terminal capability request information in the explicit request manner; and if the quantity of capability identifiers included in the second capability identifier information is less than the quantity of capability identifiers included in the third capability identifier information, the third capability identifier information is carried in the terminal capability request information in the implicit request manner.

In summary, capability identifier information that includes a relatively small quantity of capability identifiers is selected and carried in the terminal capability request message, and sent to the first communications device, so that system resources can be saved.

For example, it is assumed that the first capability identifier information includes a capability identifier 1, a capability identifier 2, a capability identifier 3, a capability identifier 4, and a capability identifier 5, and the mapping relationship that is between the capability identifier information and the terminal capability and that is stored on the first target end does not have a terminal capability to which the capability identifier 1 is mapped or a terminal capability to which the capability identifier 3 is mapped, but has a terminal capability to which the capability identifier 2 is mapped, a terminal capability to which the capability identifier 4 is mapped, and a terminal capability to which the capability identifier 5 is mapped. In this case, the capability identifier 1 and the capability identifier 3 that have the mapped terminal capabilities may be carried in the terminal capability request information. In this way, after receiving the foregoing terminal capability request information, the first communications device may add, to the first related information of the terminal capability, at least the terminal capability to which the capability identifier 1 is mapped and the terminal capability to which the capability identifier 3 is mapped.

It is assumed that the first capability identifier information includes a capability identifier a, a capability identifier b, a capability identifier c, a capability identifier d, and a capability identifier e, and the mapping relationship that is between the capability identifier information and the terminal capability and that is stored on the first target end has a terminal capability to which the capability identifier a is mapped, but does not have a terminal capability to which the capability identifier b is mapped, a terminal capability to which the capability identifier c is mapped, a terminal capability to which the capability identifier d is mapped, or a terminal capability to which the capability identifier e is mapped. The capability identifier a with a mapped terminal capability may be carried in the terminal capability request information. In this way, after receiving the foregoing terminal capability request information, the first communications device may derive, based on the capability identifier a, the capability identifier b, the capability identifier c, the capability identifier c, the capability identifier d, and the capability identifier e that are stored in the first communications device and the capability identifier a that has a mapped terminal capability and that is carried in the terminal capability request information, the mapping relationship that is between the terminal identifier information and the terminal capability and that is stored on the first target end does not have the terminal capabilities to which the capability identifier b, the capability identifier c, the capability identifier d, and the capability identifier e are mapped, so that the first related information of the terminal capability can carry at least the terminal capabilities to which the capability identifier b, the capability identifier c, the capability identifier d, and the capability identifier e are mapped.

Scenario 3: The first target end determines that the mapping relationship that is between the terminal identifier information and the terminal capability and that is stored on the first target end does not have the terminal capability information, in other words, does not have the terminal capability and/or the capability identifier information.

In this scenario, the first target end may add the null value and/or the second indication information to the terminal capability request information. In this way, after receiving the foregoing terminal capability request information, the first communications device may add at least one of the following to the first related information of the terminal capability: the terminal capability of the terminal, the capability identifier information to which the terminal capability of the terminal is mapped, the first capability identifier information, and the terminal capability to which the first capability identifier information is mapped. In this way, the mapping relationship between the capability identifier information and the terminal capability is updated.

It should be noted that the plurality of optional implementations described in this embodiment of the present disclosure may be implemented in combination with each other, or may be separately implemented. This is not limited in this embodiment of the present disclosure.

Based on the capability management method in this embodiment, when the first target end lacks the terminal capability to which the capability identifier information is mapped, because a plurality of first communications devices have a same terminal capability, the first target end may obtain the terminal capability from one first communications device. The first communications device receives the terminal capability request information, and sends the first related information of the terminal capability according to the first indication information that is included in the terminal capability request message and that is used to indicate the requested terminal capability, so that overheads of sending the terminal capability can be reduced, and reliability and accuracy of a terminal capability to which a terminal capability identifier is mapped can be ensured.

Figure 2:
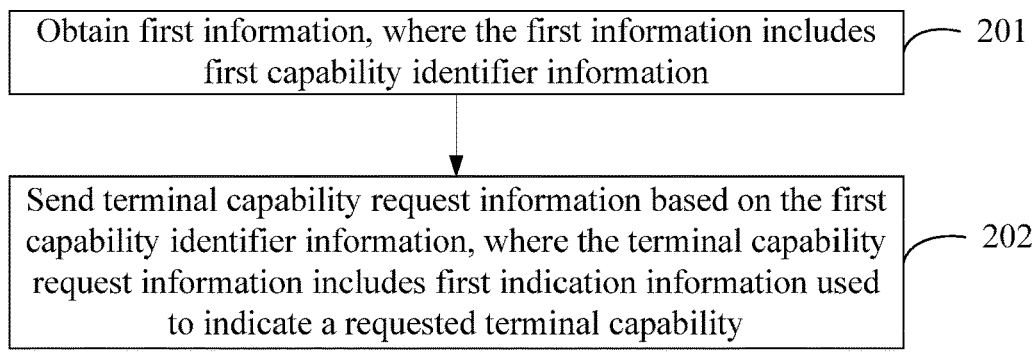
FIG. 2 is a flowchart 2 of a capability management method according to an embodiment of the present disclosure.

FIG. 2 is a flowchart 2 of a capability management method according to an embodiment of the present disclosure. The capability management method in this embodiment is applied to a second communications device, and the second communications device may include at least one of the following: a RAN network element and a CN network element. It should be noted that this embodiment is used as an implementation of the second communications device corresponding to the method embodiment corresponding to FIG. 1. Therefore, the second communications device in this embodiment may be understood as the first target end in the method embodiment corresponding to FIG. 1.

As shown in FIG. 2, the capability management method in this embodiment may include the following steps.

Step 201: Obtain first information, where the first information includes first capability identifier information.

In specific implementation, the obtaining first information may be: receiving first information sent by a second target end.

The second target end may include at least one of the following: a terminal, a CN network element, and a RAN network element. In an implementation, if the second communications device is a CN network element, the second target end may be at least one of the following: a terminal and a RAN network element. If the second communications device is a RAN network element, the second target end may be at least one of the following: a terminal and a CN network element.

Step 202: Send terminal capability request information based on the first capability identifier information, where the terminal capability request information includes first indication information used to indicate a requested terminal capability.

In this embodiment, the second communications device may preferentially send the terminal capability request information to another network side network element, and then send the terminal capability request information to a terminal when no other network elements request the terminal capability. For example, when the second communications device is a CN network element, the CN network element may preferentially send the terminal capability request information to a RAN network element, and then send the terminal capability request information to the terminal when the RAN network element does not request the terminal capability either.

It should be understood that when there are a plurality of terminals that have requested terminal capabilities, the second communications device may need to send the terminal capability request information to only one terminal.

In this step, the second communications device may determine, based on a stored mapping relationship between capability identifier information and a terminal capability and the second capability identifier information, an actual sending practice and content carried in the terminal capability request information.

Optionally, the sending terminal capability request information based on the first capability identifier information includes:

sending the terminal capability request information based on the first capability identifier information when a preset condition is met.

The meeting the preset condition includes at least one of the following:

there is no terminal capability to which the first capability identifier information is mapped; and there is no terminal capability to which second capability identifier information in the first capability identifier information is mapped.

In other words, if the mapping relationship that is between the capability identifier information and the terminal capability and that is stored in the second communications device does not have the terminal capability to which the first capability identifier information is mapped, does not have the terminal capability to which the second capability identifier information is mapped, the second communications device may send the terminal capability request information.

Optionally, the first indication information may include at least one of the following: first capability identifier information, second capability identifier information, third capability identifier information, second indication information indicating that there is no terminal capability information, and a null value used to indicate that there is no terminal capability information.

The third capability identifier information is capability identifier information with a mapped terminal capability in the first capability identifier information.

This embodiment is used as an implementation of the second communications device corresponding to the method embodiment corresponding to FIG. 1. Therefore, the terminal capability request information in this step is the same as the terminal capability request information in the method embodiment corresponding to FIG. 1. For details, refer to related descriptions in the foregoing method embodiment. Details are not described herein.

In addition, optionally, after the sending terminal capability request information based on the first capability identifier information, the method further includes:

receiving first related information of the terminal capability that is returned according to the first indication information.

This embodiment is used as an implementation of the second communications device corresponding to the method embodiment corresponding to FIG. 1. Therefore, the first related information of the terminal capability that is received by the second communications device is the same as the first related information of the terminal capability in the method embodiment corresponding to FIG. 1. For details, refer to related descriptions in the foregoing method embodiment. Details are not described herein.

It should be noted that the plurality of optional implementations described in this embodiment of the present disclosure may be implemented in combination with each other, or may be separately implemented. This is not limited in this embodiment of the present disclosure.

In the capability management method in this embodiment, the second communications device obtains the first information, where the first information includes the first capability identifier information; and sends the terminal capability request information based on the first capability identifier information, where the terminal capability request information includes the first indication information used to indicate the requested terminal capability, so that overheads of sending the terminal capability can be reduced, and reliability and accuracy of a terminal capability to which a terminal capability identifier is mapped can be ensured.

In addition, when there are a plurality of terminals that have requested terminal capabilities, sending the terminal capability of the terminal can be greatly reduced, and complexity of configuring the terminal capability at the background by an operator can be released, and accuracy of the terminal capability is ensured, and reliability can be greatly improved. In addition, a capability of a roaming terminal can be obtained and an effect that sending of the capability of the roaming terminal is reduced can be achieved.

It should be noted that, in this embodiment of the present disclosure, the method embodiment corresponding to FIG. 1 and the method embodiment corresponding to FIG. 2 may be separately implemented, or may be implemented in combination.

The following describes, by using an example and with reference to an embodiment, a scenario in which the method embodiment corresponding to FIG. 1 and the method embodiment corresponding to FIG. 2 are implemented in combination.

Embodiment 1

This embodiment mainly describes a process in which a terminal sends first capability identifier information to a CN network element.

Figure 3:
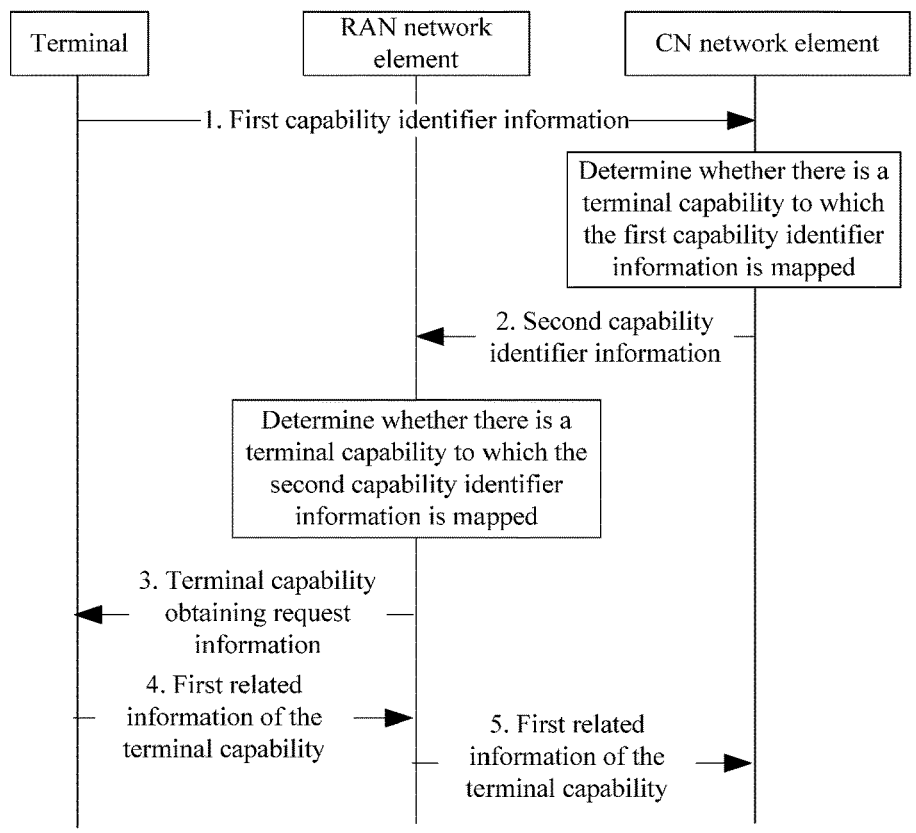
FIG. 3 is a flowchart 3 of a capability management method according to an embodiment of the present disclosure.

As shown in FIG. 3, a capability management method in this embodiment may include the following steps.

Step 1: A terminal may send first capability identifier information to a CN network element by using a RAN network element.

The first capability identifier information may be carried in a NAS (Non-access stratum) message for transmission, but is not limited thereto.

The CN network element may be an AMF, an MME, or a capability management function.

Optionally, the CN network element determines whether a mapping relationship that is between capability identifier information and a terminal capability and that is stored in the CN network element has a terminal capability to which the first capability identifier information is mapped.

If the first capability identifier information includes second capability identifier information, and the second capability identifier information has no mapped terminal capability, the CN network element may request, from the RAN network element, to obtain a terminal capability to which the second capability identifier information is mapped.

Step 2: The CN network element sends the second capability identifier information to the RAN network element.

The second capability identifier information may be carried in an IUCS (Initial UE Context Setup) request, but is not limited thereto.

The RAN network element determines whether the mapping relationship that is between the capability identifier information and the terminal capability and that is stored in the RAN network element has the terminal capability to which the second capability identifier information is mapped.

If yes, step 5 is performed. If no, step 3 is performed.

Step 3: The RAN network element sends terminal capability request information to the terminal.

The terminal capability request information may include the second capability identifier information.

The terminal capability request information may be carried in an RRC (Radio Resource Control) message for transmission, or may certainly be carried in another downlink message for transmission. This is not limited herein.

Step 4: The terminal returns first related information of a terminal capability to the RAN network element.

The first related information of the terminal capability may include the terminal capability corresponding to the second capability identifier information, and may further include the second capability identifier information.

The first related information of the terminal capability may be carried in the RRC message for transmission, but is not limited thereto.

The RAN network element stores the first related information of the terminal capability.

Step 5: The RAN network element sends the first related information of the terminal capability to the CN network element.

The CN network element stores the first related information of the terminal capability, to update the mapping relationship between the capability identifier information and the terminal capability.

In this embodiment, after receiving the capability identifier information sent by the terminal, the CN network element may first determine whether there is a terminal capability corresponding to the capability identifier information. When some or all capability identifiers in the foregoing capability information have no mapped terminal capability, the CN network element may preferentially send a capability identifier with no mapped terminal capability to the RAN network element, to request to obtain the terminal capability to which the capability identifier is mapped. If the RAN network element does not have the terminal capability to which the capability identifier is mapped, the RAN network element may further request, from the terminal, the terminal capability to which the capability identifier is mapped, and forward, to the CN network element, the terminal capability sent by the terminal, to update a mapping relationship that is between the capability identifier information and the terminal capability and that is in the CN network element It can be learned that in this embodiment, the CN network element and the RAN network element may first exchange identifier information with a mapped terminal capability or with no mapped terminal capability, and then determine, based on an exchanging result, whether terminal capabilities need to be synchronized. Therefore, when a terminal capability requested by the CN network element exists in the RAN network element, signaling interaction between the RAN network element and the terminal can be avoided, thereby saving system resources.

It should be noted that when there are a plurality of terminals that have the terminal capability requested by the CN network element, the CN network element may send the terminal capability request information to one of the terminals, thereby further reducing signaling overheads of sending the terminal capability.

Embodiment 2

This embodiment mainly describes a process in which a terminal sends first capability identifier information to a CN network element.

Figure 4:
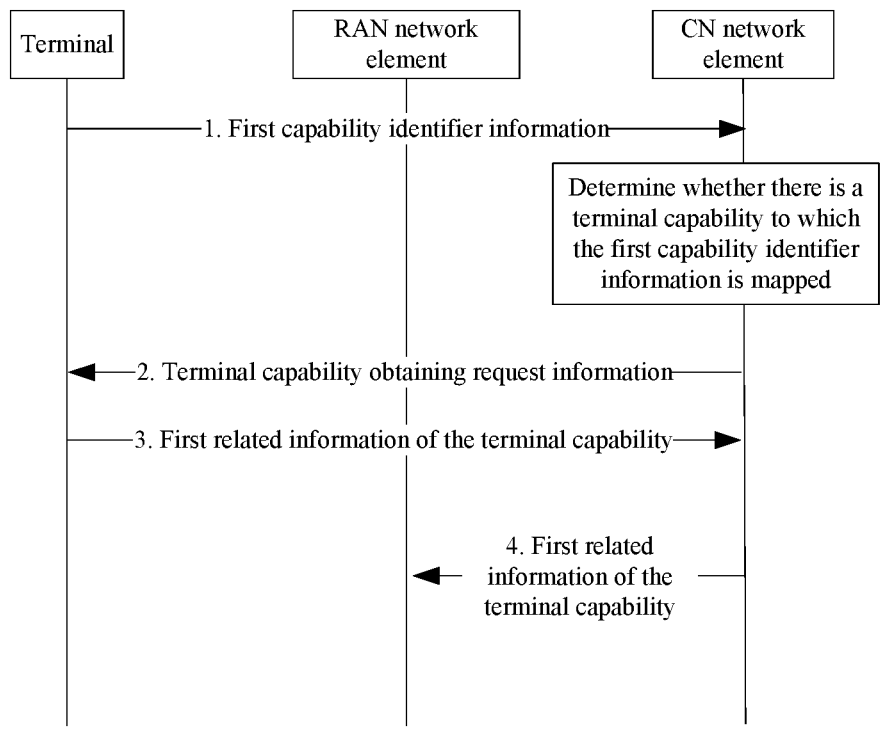
FIG. 4 is a flowchart 4 of a capability management method according to an embodiment of the present disclosure.

As shown in FIG. 4, a capability management method in this embodiment may include the following steps.

Step 1: A terminal sends first capability identifier information to a CN network element by using a RAN network element.

The first capability identifier information may be transmitted in a NAS (Non-access stratum), but is not limited thereto.

Optionally, the CN network element determines whether a mapping relationship that is between capability identifier information and a terminal capability and that is stored in the CN network element has a terminal capability to which the first capability identifier information is mapped.

If the first capability identifier information includes second capability identifier information, and the second capability identifier information has no mapped terminal capability, the CN network element may request, from the terminal, to obtain a terminal capability to which the second capability identifier information is mapped.

Step 2: The CN network element sends terminal capability request information to the terminal.

The terminal capability request information may include the second capability identifier information.

The terminal capability request information may be transmitted in the NAS, but is not limited thereto.

Step 3: The terminal returns first related information of a terminal capability to the CN network element.

The first related information of the terminal capability may include the terminal capability corresponding to the second capability identifier information, and may further include the second capability identifier information.

The first related information of the terminal capability may be transmitted in the NAS, but is not limited thereto.

The CN network element stores the first related information of the terminal capability.

Step 4: The CN network element sends the first related information of the terminal capability to the RAN network element.

The first related information of the terminal capability may include the terminal capability corresponding to the second capability identifier information, and may further include the second capability identifier information.

The first related information of the terminal capability may be carried in an IUCS request for transmission, but is not limited thereto.

The RAN network element stores the first related information of the terminal capability.

In this embodiment, after receiving the capability identifier information sent by the terminal, the CN network element may first determine whether there is a terminal capability corresponding to the capability identifier information. When some or all capability identifiers in the foregoing capability information have no mapped terminal capability, the CN network element may directly request, from the terminal, a terminal capability to which the capability identifier with no mapped terminal capability is mapped. Therefore, when the RAN network element does not have the terminal capability requested by the CN network element, request time of the terminal capability can be reduced.

In addition, after receiving the first related information that is of the terminal capability and that is sent by the terminal, the CN network element may forward the first related information of the terminal capability to the RAN network element, so that a terminal capability in the CN network element and a terminal capability in the RAN network element can be synchronized, and the RAN network element does not need to request the terminal capability, thereby reducing signaling overheads.

It should be noted that when there are a plurality of terminals that have the terminal capability requested by the CN network element, the CN network element may send the terminal capability request information to one of the terminals, thereby further reducing signaling overheads of sending the terminal capability.

Embodiment 3

This embodiment mainly describes a process in which a terminal sends first capability identifier information to a RAN network element.

Figure 5:
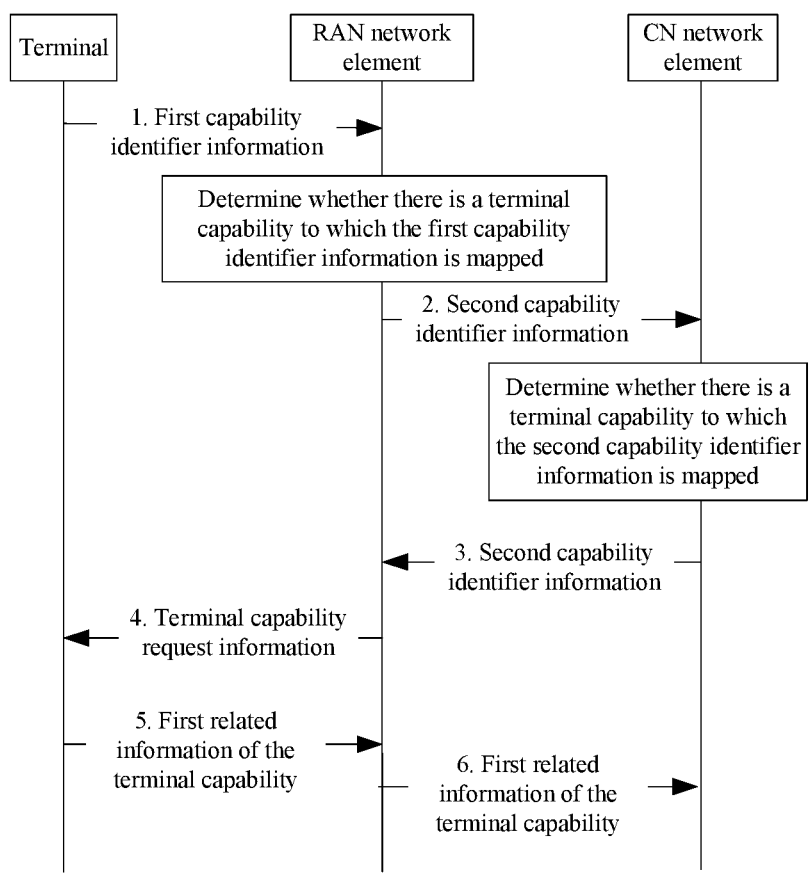
FIG. 5 is a flowchart 5 of a capability management method according to an embodiment of the present disclosure.

As shown in FIG. 5, a capability management method in this embodiment may include the following steps.

Step 1: A terminal sends first capability identifier information to a RAN network element.

The first capability identifier information may be carried in an RRC message for transmission, but is not limited thereto.

Optionally, the RAN network element determines whether a mapping relationship that is between capability identifier information and a terminal capability and that is stored in the RAN network element has a terminal capability to which the first capability identifier information is mapped.

If the first capability identifier information includes second capability identifier information, and the second capability identifier information has no mapped terminal capability, the RAN network element may request, from a CN network element, to obtain a terminal capability to which the second capability identifier information is mapped.

The CN network element may be an AMF, an MME, or a capability management function.

Step 2: The RAN network element sends the second capability identifier information to the CN network element.

The second capability identifier information may be carried in an initial UE message, but is not limited thereto.

The CN network element determines whether a mapping relationship that is between the capability identifier information and the terminal capability and that is stored in the CN network element has the terminal capability to which the second capability identifier information is mapped.

If no, step 3 is performed.

Step 3: The CN network element sends the second capability identifier information to the RAN network element.

In this step, the second capability identifier information may be carried in an IUCS request message.

Step 4: The RAN network element sends terminal capability request information to the terminal.

The terminal capability request information may include the second capability identifier information.

The terminal capability request information may be carried in an RRC message for transmission, or may certainly be carried in another downlink message for transmission. This is not limited herein.

Step 6: The terminal returns first related information of a terminal capability to the RAN network element.

The first related information of the terminal capability may include the terminal capability corresponding to the second capability identifier information, and may further include the second capability identifier information.

The first related information of the terminal capability may be carried in the RRC message for transmission, but is not limited thereto.

The RAN network element stores the first related information of the terminal capability.

Step 7: The RAN network element sends the first related information of the terminal capability to the CN network element.

The CN network element stores the first related information of the terminal capability, to update the mapping relationship between the capability identifier information and the terminal capability.

In this embodiment, after receiving the capability identifier information sent by the terminal, the RAN network element may first determine whether there is a terminal capability corresponding to the capability identifier information. When some or all capability identifiers in the foregoing capability information have no mapped terminal capability, the RAN network element may preferentially send a capability identifier with no mapped terminal capability to the CN network element, to request to obtain the terminal capability to which the capability identifier is mapped. If the CN network element does not have the terminal capability to which the capability identifier is mapped, the RAN network element may further request, from the terminal, the terminal capability to which the capability identifier is mapped, and forward, to the CN network element, the terminal capability sent by the terminal, to update the mapping relationship that is between the capability identifier information and the terminal capability and that is in the CN network element. It can be learned that in this embodiment, the CN network element and the RAN network element may first exchange identifier information with a mapped terminal capability or with no mapped terminal capability, and then determine, based on an exchanging result, whether terminal capabilities need to be synchronized. Therefore, when a terminal capability requested by the CN network element exists in the RAN network element, signaling interaction between the RAN network element and the terminal can be avoided, thereby saving system resources.

It should be noted that when there are a plurality of terminals that have the terminal capability requested by the RAN network element, the CN network element may send the terminal capability request information to one of the terminals, thereby further reducing signaling overheads of sending the terminal capability.

Embodiment 4

This embodiment mainly describes a process in which a first CN network element sends first capability identifier information to a second CN network element. The first CN network element may be an AMF or an MME, and the second CN network element may be a capability management function.

Figure 6:
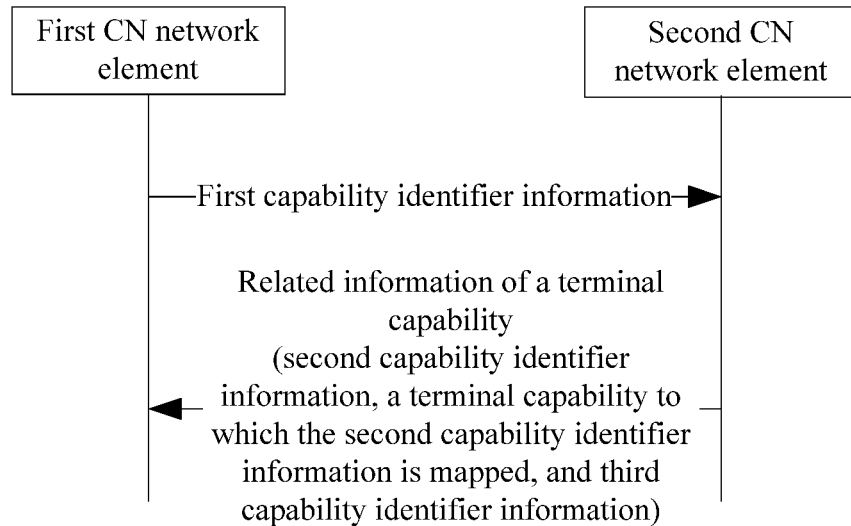
FIG. 6 is a flowchart 6 of a capability management method according to an embodiment of the present disclosure.

As shown in FIG. 6, a capability management method in this embodiment may include the following steps.

Step 1: A first CN network element sends first capability identifier information to a second CN network element.

Optionally, the second CN network element may determine whether a mapping relationship that is between capability identifier information and a terminal capability and that is stored in the CN network element has a terminal capability to which the first capability identifier information is mapped.

If the first capability identifier information includes second capability identifier information and third capability identifier information, and the second capability identifier information has no mapped terminal capability, step 2 is performed when the third capability identifier information has a mapped terminal capability.

Step 2: The second CN network element sends related information of a terminal capability to the first CN network element.

The related information of the terminal capability includes the second capability identifier information, the terminal capability to which the second capability identifier information is mapped, and the third capability identifier information.

In this way, the first CN network element may subsequently request the capability to which the second capability identifier information is mapped, and does not need to request a terminal capability to which the third capability identifier information is mapped, thereby reducing signaling overheads of sending the terminal capability.

Figure 7:
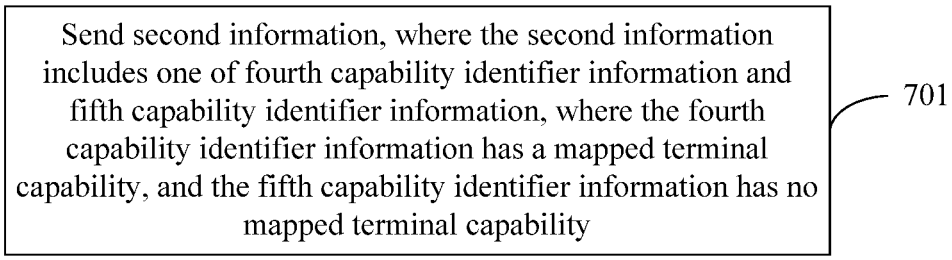
FIG. 7 is a flowchart 7 of a capability management method according to an embodiment of the present disclosure.

FIG. 7 is a flowchart 7 of a capability management method according to an embodiment of the present disclosure. The capability management method in this embodiment is applied to a third communications device, and the third communications device may include at least one of the following: a RAN network element and a CN network element.

As shown in FIG. 7, the capability management method in this embodiment may include the following steps.

Step 701: Send second information, where the second information includes one of fourth capability identifier information and fifth capability identifier information.

The fourth capability identifier information has a mapped terminal capability, and the fifth capability identifier information has no mapped terminal capability. In an implementation, the fourth capability identifier information may be capability identifier information with a mapped terminal capability on the third communications device, and may be applicable to all terminals or may be independent of a terminal. The fifth capability identifier information may be capability identifier information with no mapped terminal capability on the third communications device, and may be applicable to all terminals or may be independent of a terminal.

In specific implementation, the sending second information may be: sending the second information to a third target end.

The third target end may include at least one of the following: a terminal, a CN network element, and a RAN network element.

In an implementation, if the third communications device is a CN network element, the third target end may be at least one of the following: a terminal and a RAN network element. If the third communications device is a RAN network element, the third target end may be at least one of the following: a terminal and a CN network element.

In this embodiment, the third communications device sends the second information to the third target end, to notify, in advance, the third target end of capability identifier information with a mapped terminal capability and capability identifier information with no mapped terminal capability in capability identifiers stored on the third target end.

In this way, when the third target end is to send terminal capability identifier information to the third communications device, if the to-be-sent capability identifier information to which the terminal capability is mapped belongs to the fourth capability identifier information, only the capability identifier to which the terminal capability is mapped may be sent, and the terminal capability is no longer sent, thereby reducing signaling overheads of sending the terminal capability.

If the to-be-sent capability identifier to which the terminal capability is mapped belongs to the fifth capability identifier information or does not belong to the fourth capability identifier information, the terminal capability and the mapped capability identifier may be simultaneously sent. Therefore, the third communications device obtains the terminal capability of the terminal.

Figure 8:
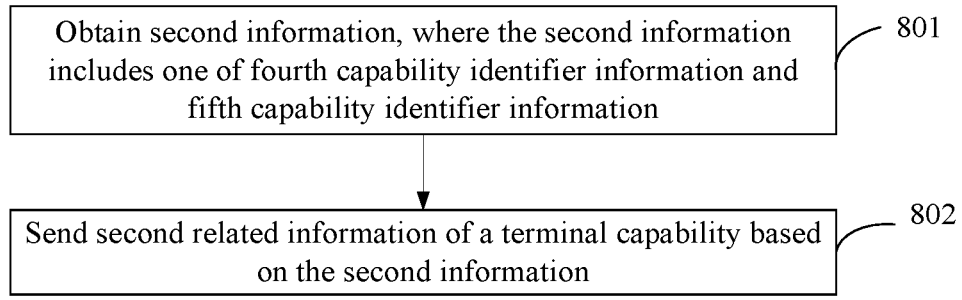
FIG. 8 is a flowchart 8 of a capability management method according to an embodiment of the present disclosure.

FIG. 8 is a flowchart 8 of a capability management method according to an embodiment of the present disclosure. The capability management method in this embodiment is applied to a fourth communications device, and the fourth communications device may include at least one of the following: a terminal, a CN network element, and a RAN network element. It should be noted that this embodiment is used as an implementation of the fourth communications device corresponding to the method embodiment corresponding to FIG. 7. Therefore, the fourth communications device in this embodiment may be understood as the third target end in the method embodiment corresponding to FIG. 7.

As shown in FIG. 8, the capability management method in this embodiment may include the following steps.

Step 801: Obtain second information, where the second information includes one of fourth capability identifier information and fifth capability identifier information.

The fourth capability identifier information has a mapped terminal capability, and the fifth capability identifier information has no mapped terminal capability.

In specific implementation, the obtaining second information may be: receiving second information sent by a fourth target end.

The fourth target end may include at least one of the following: a terminal, a CN network element, and a RAN network element.

In an implementation, if the fourth communications device is a CN network element, the fourth target end may be at least one of the following: a terminal and a RAN network element. If the fourth communications device is a RAN network element, the fourth target end may be at least one of the following: a terminal and a CN network element.

It should be noted that this embodiment is used as an implementation of the fourth communications device corresponding to the method embodiment corresponding to FIG. 7. Therefore, the fourth target end may be understood as the third communications device in the method embodiment corresponding to FIG. 7.

Step 802: Send second related information of a terminal capability based on the second information.

In this step, after obtaining the second information, the fourth communications device may determine and send, based on the second information, the second related information of the terminal capability that needs to be sent.

Optionally, the second related information of the terminal capability includes at least one of the following: capability identifier information and the terminal capability.

It should be noted that the second related information of the terminal capability may include the fifth capability identifier information and capability identifier information other than the fifth capability identifier information and/or the fifth capability identifier information and a terminal capability to which capability identifier information other than the fifth capability identifier information is mapped.

Optionally, the second related information of the terminal capability may include at least one of the following:

the fourth capability identifier information; and/or the fifth capability identifier information and a terminal capability to which the fifth capability identifier information is mapped.

It is not difficult to understand that, if the fourth communications device has the terminal capability to which the fifth capability identifier is mapped, the fourth communications device may send the terminal capability to the fourth target end.

Optionally, before the sending second related information of a terminal capability based on the second information, the method further includes:

obtaining first capability identifier information.

After obtaining the first capability identifier information, the fourth communications device may determine content of the second related information of the terminal capability based on the second information.

Optionally, at least one of the following may be included:

when a first condition is met, the second related information of the terminal capability includes the first capability identifier information and a terminal capability to which the first capability identifier information is mapped, and the first condition includes at least one of the following: the first capability identifier information does not belong to the fourth capability identifier information, and the first capability identifier information belongs to the fifth capability identifier information;

when a second condition is met, the second related information of the terminal capability includes the first capability identifier information, and the second condition includes at least one of the following: the first capability identifier information belongs to the fourth capability identifier information, and the first capability identifier information does not belong to the fifth capability identifier information; and when a third condition is met, the second related information of the terminal capability includes third capability identifier information, second capability identifier information, and a terminal capability to which the second capability identifier information is mapped, and the third condition includes at least one of the following: the third capability identifier information belongs to the fourth capability identifier information, the third capability identifier information does not belong to the fifth capability identifier information, the second capability identifier information does not belong to the fourth capability identifier information, and the second capability identifier information belongs to the fifth capability identifier information, where the second capability identifier information and the third capability identifier information belong to the first capability identifier information.

It should be understood that if the second capability identifier information does not belong to the fourth capability identifier information, the second capability identifier information may belong to the fifth capability identifier information, or may not belong to the fifth capability identifier information. Similarly, if the second capability identifier information does not belong to the fifth capability identifier information, the second capability identifier information may belong to the fourth capability identifier information, or may not belong to the fourth capability identifier information.

In a scenario in which the first condition is met, if the first capability identifier information belongs to the fifth capability identifier information or does not belong to the fourth capability identifier information, it indicates that the terminal capability to which the first capability identifier information is mapped does not exist on the fourth target end. Therefore, the second related information of the terminal capability may include the first capability identifier information and the terminal capability to which the first capability identifier information is mapped.

In a scenario in which the second condition is met, if the first capability identifier information belongs to the fourth capability identifier information or does not belong to the fifth capability identifier information, it indicates that the terminal capability to which the first capability identifier information is mapped exists on the fourth target end. Therefore, the second related information of the terminal capability may include the first capability identifier information, and does not include the terminal capability to which the first capability identifier information is mapped, so that signaling overheads of sending the terminal capability can be reduced.

If the first capability identifier information belongs to the fifth capability identifier information or does not belong to the fourth capability identifier information, it indicates that the terminal capability to which the first capability identifier information is mapped does not exist on the fourth target end. Therefore, the second related information of the terminal capability may include the first capability identifier information, and may further include the terminal capability to which the first capability identifier information is mapped.

In a scenario in which the third condition is met, the first capability identifier information includes at least two capability identifiers. If the third capability identifier information in the first capability identifier information belongs to the fourth capability identifier information or does not belong to the fifth capability identifier information, and the second capability identifier information in the first capability identifier does not belong to the fourth capability identifier information or belongs to the fifth capability identifier information, it indicates that a terminal capability to which the second capability identifier information is mapped does not exist on the fourth target end, and a terminal capability to which the third capability identifier information is mapped exists. Therefore, the second related information of the terminal capability may include the third capability identifier information, the second capability identifier information, and the terminal capability to which the second capability identifier information is mapped, and does not include the terminal capability to which the third capability identifier information is mapped, so that signaling overheads of sending the terminal capability can be reduced. Other cases may be deduced based on the same principle, and are not listed herein exhaustively.

It can be learned from the foregoing descriptions that, in this embodiment, for sending the terminal capability, the fourth communications device may send only a terminal capability to which a capability identifier with no mapped terminal capability on the fourth target end is mapped, and does not send a terminal capability to which a capability identifier with a mapped terminal capability on the fourth target end is mapped, so that signaling overheads of sending the terminal capability can be reduced.

For ease of understanding, example descriptions are as follows:

In an implementation, the first capability identifier information is first capability identifier information of the terminal. The terminal needs to access the fourth target end.

Specifically, when the first capability identifier information is capability identifier information with a mapped terminal capability on the fourth target end, context of the terminal sent to the fourth target end may include the first capability identifier information, and does not include the terminal capability to which the first capability identifier information is mapped.

When the first capability identifier information is capability identifier information with no mapped terminal capability on the fourth target end, context of the terminal sent to the fourth target end may include identifier information of the terminal capability and information about the mapped terminal capability.

Based on the capability management method in this embodiment, the fourth communications device obtains the second information, where the second information includes one of the following: the fourth capability identifier information and the fifth capability identifier information; and sends the second related information of the terminal capability based on the second information, where the fourth capability identifier information has a mapped terminal capability, and the fifth capability identifier information has no mapped terminal capability. Therefore, overheads of sending the terminal capability can be reduced, and reliability and accuracy of a terminal capability to which a terminal capability identifier is mapped can be ensured.

It should be noted that, in the embodiments of the present disclosure, the method embodiment corresponding to FIG. 7 and the method embodiment corresponding to FIG. 8 may be separately implemented, or may be implemented in combination.

The following describes, by using an example and with reference to an embodiment, a scenario in which the method embodiment corresponding to FIG. 7 and the method embodiment corresponding to FIG. 8 are implemented in combination.

Embodiment 5

Figure 9:
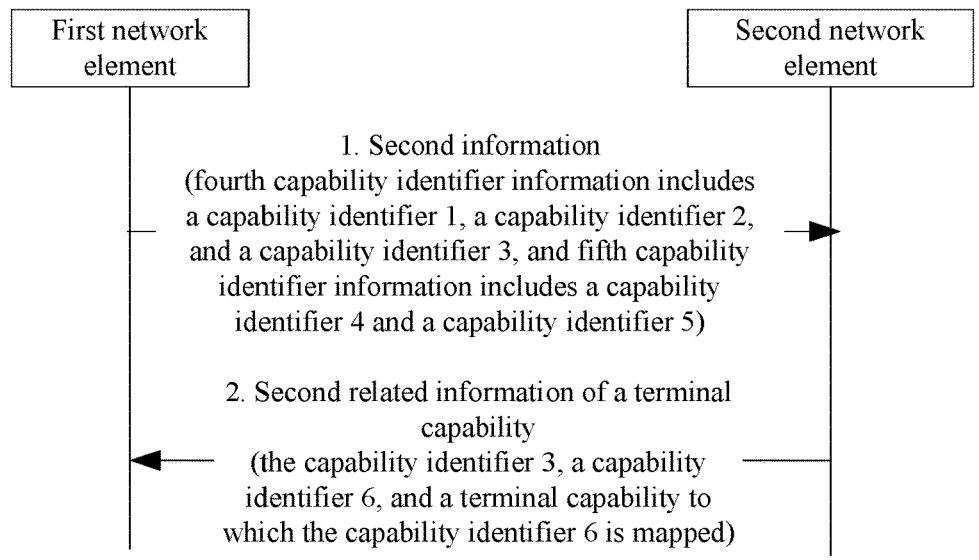
FIG. 9 is a flowchart 9 of a capability management method according to an embodiment of the present disclosure.

As shown in FIG. 9, a capability management method in this embodiment may include the following steps.

Step 1: A first network element sends second information to a second network element.

The first network element may be a CN network element or a RAN network element. The second network element may be a CN network element or a RAN network element.

As shown in FIG. 9, in this step, the second information includes fourth capability identifier information and fifth capability identifier information, the fourth capability identifier information includes a capability identifier 1, a capability identifier 2, and a capability identifier 3, and the fifth capability identifier information includes a capability identifier 4 and a capability identifier 5.

Step 2: The second network element sends second related information of a terminal capability to the first network element.

In this embodiment, the second network element may send the second related information of the terminal capability when sending a handover request or a context response.

In an implementation, step 1 and step 2 are asynchronous processes. Step 2 only occurs when a terminal accesses the first network element. For example, the terminal is handed over from the second network element to the first network element. The second network element sends a terminal context response message to the first network element, and the second network element sends a terminal context setup request message to the first network element. It is assumed that capability identifier information of the terminal is the capability identifier 3 and the capability identifier 6. The second network element can learn, based on the received second information, that a terminal capability to which the capability identifier 3 is mapped exists in the first network element, and the capability identifier 6 and a terminal capability to which the capability identifier 6 is mapped do not exist in the first network element. Therefore, in this application scenario, the second related information that is of the terminal capability and that is sent by the second network element may include the capability identifier 3, the capability identifier 6, and the terminal capability to which the capability identifier 6 is mapped.

In this way, the second related information of the terminal capability may not include the terminal capability to which the capability identifier 3 is mapped, so that signaling overheads of sending the terminal capability can be reduced.

Embodiment 6

Figure 10:
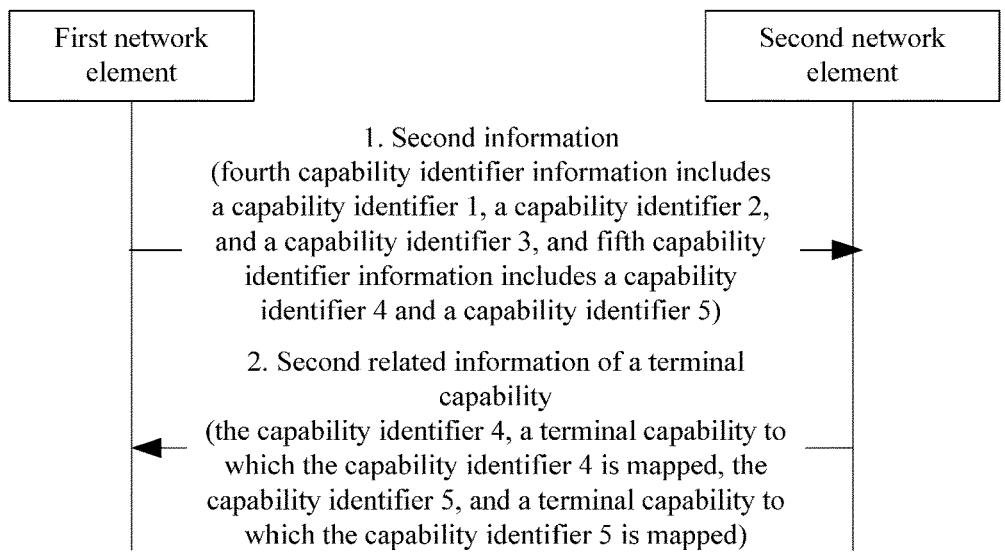
FIG. 10 is a flowchart 10 of a capability management method according to an embodiment of the present disclosure.

As shown in FIG. 10, a capability management method in this embodiment may include the following steps.

Step 1: A first network element sends second information to a second network element.

The first network element may be a CN network element or a RAN network element. The second network element may be a CN network element or a RAN network element.

As shown in FIG. 10, in this step, the second information includes fourth capability identifier information and fifth capability identifier information, the fourth capability identifier information includes a capability identifier 1, a capability identifier 2, and a capability identifier 3, and the fifth capability identifier information includes a capability identifier 4 and a capability identifier 5.

Step 2: The second network element sends second related information of a terminal capability to the first network element.

In this embodiment, the second information may be understood as terminal capability request information, in other words, the first network element requests, from the second network element, a terminal capability to which the capability identifier 4 is mapped and a terminal capability to which the capability identifier 5 is mapped.

It is assumed that the second network element has the terminal capability to which the capability identifier 4 is mapped and the terminal capability to which the capability identifier 5 is mapped. The second related information of the terminal capability may include the capability identifier 4, the terminal capability to which the capability identifier 4 is mapped, the capability identifier 5, and the terminal capability to which the capability identifier 5 is mapped.

In this way, the second network element may notify the first network element of the terminal capability to which the capability identifier 4 is mapped and the terminal capability to which the capability identifier 5 is mapped, so that a terminal capability of the first network element can be supplemented.

Figure 11:
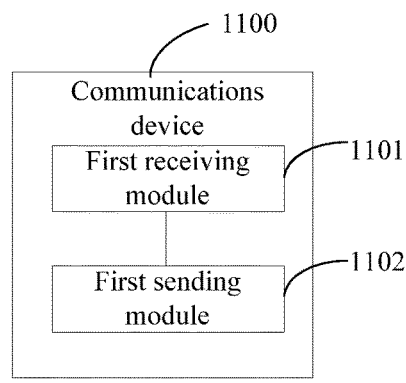
FIG. 11 is a structural diagram 1 of a communications device according to an embodiment of the present disclosure.

FIG. 11 is a structural diagram 1 of a communications device according to an embodiment of the present disclosure. The communications device in this embodiment is the first communications device in the foregoing method embodiment. As shown in FIG. 11, a communications device 1100 includes:

a first receiving module 1101, configured to receive terminal capability request information, where the terminal capability request information includes first indication information used to indicate a requested terminal capability; and a first sending module 1102, configured to send first related information of the terminal capability according to the first indication information.

Optionally, the first indication information may include at least one of the following: first capability identifier information, second capability identifier information, third capability identifier information, second indication information indicating that there is no terminal capability information, and a null value used to indicate that there is no terminal capability information.

The second capability identifier information is capability identifier information with no mapped terminal capability in the first capability identifier information, and the third capability identifier information is capability identifier information with a mapped terminal capability in the first capability identifier information.

Optionally, the first related information of the terminal capability includes at least one of the following: a terminal capability to which the first capability identifier information is mapped, a terminal capability to which the second capability identifier information is mapped, and a terminal capability of a terminal.

Optionally, the first related information of the terminal capability further includes at least one of the following: the first capability identifier information, the second capability identifier information, and capability identifier information to which the terminal capability of the terminal is mapped.

Optionally, when the first indication information includes the first capability identifier information, the first related information of the terminal capability includes at least one of the following: a terminal capability to which the first capability identifier information is mapped and the first capability identifier information; and/or when the first indication information includes the first capability identifier information and the third capability identifier information, and/or the first indication information includes the second capability identifier information, and/or the first indication information includes the third capability identifier information, the first related information of the terminal capability includes at least a terminal capability to which the second capability identifier information is mapped and the second capability identifier information; and/or when the first indication information includes the null value and/or the second indication information, the first related information of the terminal capability includes at least one of the following: a terminal capability of a terminal, capability identifier information to which the terminal capability of the terminal is mapped, the first capability identifier information, and a terminal capability to which the first capability identifier information is mapped.

The communications device 1100 can implement processes implemented by the first communications device in the method embodiments of the present disclosure and achieve the same beneficial effect. To avoid repetition, details are not described herein again.

Figure 12:
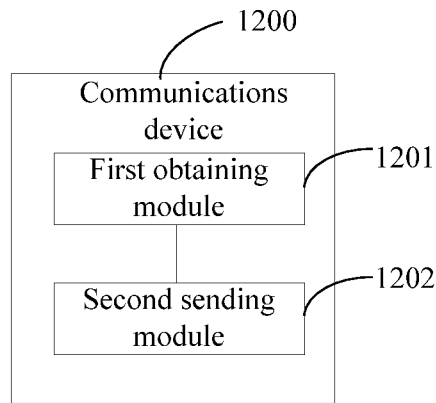
FIG. 12 is a structural diagram 2 of a communications device according to an embodiment of the present disclosure.

FIG. 12 is a structural diagram 2 of a communications device according to an embodiment of the present disclosure. The communications device in this embodiment is the second communications device in the foregoing method embodiment. As shown in FIG. 12, a communications device 1200 includes:

a first obtaining module 1201, configured to obtain first information, where the first information includes first capability identifier information; and a second sending module 1202, configured to send terminal capability request information based on the first capability identifier information, where the terminal capability request information includes first indication information used to indicate a requested terminal capability.

Optionally, the second sending module 1202 is specifically configured to:

send the terminal capability request information based on the first capability identifier information when a preset condition is met.

The meeting the preset condition includes at least one of the following:

there is no terminal capability to which the first capability identifier information is mapped; and there is no terminal capability to which second capability identifier information in the first capability identifier information is mapped.

Optionally, the first indication information may include at least one of the following: first capability identifier information, second capability identifier information, third capability identifier information, second indication information indicating that there is no terminal capability information, and a null value used to indicate that there is no terminal capability information.

The third capability identifier information is capability identifier information with a mapped terminal capability in the first capability identifier information.

Optionally, the communications device 1200 further includes:

a second receiving module, configured to: after the terminal capability request information is sent based on the first capability identifier information, receive first related information that is of the terminal capability and that is returned according to the first indication information.

The communications device 1200 can implement processes implemented by the second communications device in the method embodiments of the present disclosure and achieve the same beneficial effect. To avoid repetition, details are not described herein again.

Figure 13:
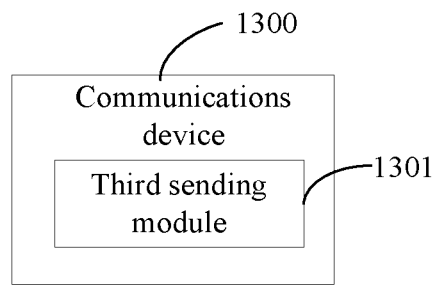
FIG. 13 is a structural diagram 3 of a communications device according to an embodiment of the present disclosure.

FIG. 13 is a structural diagram 3 of a communications device according to an embodiment of the present disclosure. The communications device in this embodiment is the third communications device in the foregoing method embodiment. As shown in FIG. 13, a communications device 1300 includes:

a third sending module 1301, configured to send second information, where the second information includes one of fourth capability identifier information and fifth capability identifier information.

The fourth capability identifier information has a mapped terminal capability, and the fifth capability identifier information has no mapped terminal capability.

The communications device 1300 can implement processes implemented by the third communications device in the method embodiments of the present disclosure and achieve the same beneficial effect. To avoid repetition, details are not described herein again.

Figure 14:
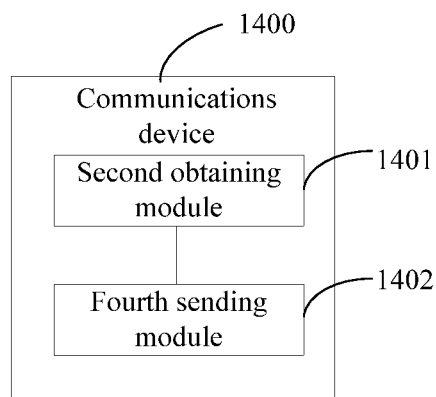
FIG. 14 is a structural diagram 4 of a communications device according to an embodiment of the present disclosure.

FIG. 14 is a structural diagram 4 of a communications device according to an embodiment of the present disclosure. The communications device in this embodiment is the fourth communications device in the foregoing method embodiment. As shown in FIG. 14, a communications device 1400 includes:

a second obtaining module 1401, configured to obtain second information, where the second information includes one of fourth capability identifier information and fifth capability identifier information; and a fourth sending module 1402, configured to send second related information of a terminal capability based on the second information.

The fourth capability identifier information has a mapped terminal capability, and the fifth capability identifier information has no mapped terminal capability.

Optionally, the second related information of the terminal capability includes at least one of the following: capability identifier information and the terminal capability.

Optionally, the second related information of the terminal capability includes:

the fourth capability identifier information; and/or the fifth capability identifier information and a terminal capability to which the fifth capability identifier information is mapped.

Optionally, the communications device 1400 further includes:

a third obtaining module, configured to obtain first capability identifier information before the second related information of the terminal capability is sent based on the second information.

Optionally, at least one of the following is included:

when a first condition is met, the second related information of the terminal capability includes the first capability identifier information and a terminal capability to which the first capability identifier information is mapped, and the first condition includes at least one of the following: the first capability identifier information does not belong to the fourth capability identifier information, and the first capability identifier information belongs to the fifth capability identifier information;

when a second condition is met, the second related information of the terminal capability includes the first capability identifier information, and the second condition includes at least one of the following: the first capability identifier information belongs to the fourth capability identifier information, and the first capability identifier information does not belong to the fifth capability identifier information; and when a third condition is met, the second related information of the terminal capability includes third capability identifier information, second capability identifier information, and a terminal capability to which the second capability identifier information is mapped, and the third condition includes at least one of the following: the third capability identifier information belongs to the fourth capability identifier information, the third capability identifier information does not belong to the fifth capability identifier information, the second capability identifier information does not belong to the fourth capability identifier information, and the second capability identifier information belongs to the fifth capability identifier information; where the second capability identifier information and the third capability identifier information belong to the first capability identifier information.

The communications device 1400 can implement processes implemented by the fourth communications device in the method embodiments of the present disclosure and achieve the same beneficial effect. To avoid repetition, details are not described herein again.

Figure 15:
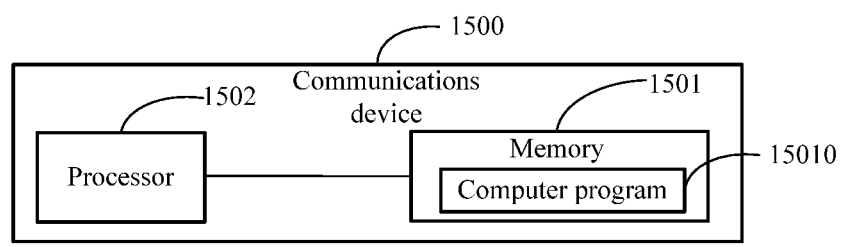
FIG. 15 is a structural diagram 5 of a communications device according to an embodiment of the present disclosure.

FIG. 15 is a structural diagram 5 of a communications device according to an embodiment of the present disclosure. As shown in FIG. 15, a communications device 1500 includes a memory 1501, a processor 1502, and a computer program 15011 that is stored in the memory 1501 and that can run on the processor 1502.

When the communications device 1500 is the first communications device in the foregoing method embodiment, the following steps are implemented when the computer program 15011 is executed by the processor 1502:

receiving terminal capability request information, where the terminal capability request information includes first indication information used to indicate a requested terminal capability; and sending first related information of the terminal capability according to the first indication information.

Optionally, the first indication information may include at least one of the following: first capability identifier information, second capability identifier information, third capability identifier information, second indication information indicating that there is no terminal capability information, and a null value used to indicate that there is no terminal capability information.

The second capability identifier information is capability identifier information with no mapped terminal capability in the first capability identifier information, and the third capability identifier information is capability identifier information with a mapped terminal capability in the first capability identifier information.

Optionally, the first related information of the terminal capability includes at least one of the following: a terminal capability to which the first capability identifier information is mapped, a terminal capability to which the second capability identifier information is mapped, and a terminal capability of a terminal.

Optionally, the first related information of the terminal capability further includes at least one of the following: the first capability identifier information, the second capability identifier information, and capability identifier information to which the terminal capability of the terminal is mapped.

Optionally, when the first indication information includes the first capability identifier information, the first related information of the terminal capability includes at least one of the following: a terminal capability to which the first capability identifier information is mapped and the first capability identifier information; and/or when the first indication information includes the first capability identifier information and the third capability identifier information, and/or the first indication information includes the second capability identifier information, and/or the indication information includes the third capability identifier information, the first related information of the terminal capability includes at least a terminal capability to which the second capability identifier information is mapped and the second capability identifier information; and/or when the first indication information includes the null value and/or the second indication information, the first related information of the terminal capability includes at least one of the following: a terminal capability of a terminal, capability identifier information to which the terminal capability of the terminal is mapped, the first capability identifier information, and a terminal capability to which the first capability identifier information is mapped.

When the communications device 1500 is the second communications device in the foregoing method embodiment, the following steps are implemented when the computer program 15011 is executed by the processor 1502:

obtaining first information, where the first information includes first capability identifier information; and sending terminal capability request information based on the first capability identifier information, where the terminal capability request information includes first indication information used to indicate a requested terminal capability.

Optionally, when the computer program 15011 is executed by the processor 1502, the following steps may be further implemented: when a preset condition is met, sending the terminal capability request information based on the first capability identifier information.

The meeting the preset condition includes at least one of the following:

there is no terminal capability to which the first capability identifier information is mapped; and there is no terminal capability to which second capability identifier information in the first capability identifier information is mapped. Optionally, the first indication information may include at least one of the following: first capability identifier information, second capability identifier information, third capability identifier information, second indication information indicating that there is no terminal capability information, and a null value used to indicate that there is no terminal capability information.

The third capability identifier information is capability identifier information with a mapped terminal capability in the first capability identifier information.

Optionally, when the computer program 15011 is executed by the processor 1502, the following steps may be further implemented: after the terminal capability request information is sent based on the first capability identifier information, receiving the first related information that is of the terminal capability and that is returned according to the first indication information.

When the communications device 1500 is the third communications device in the foregoing method embodiment, the following steps are implemented when the computer program 15011 is executed by the processor 1502:

sending second information, where the second information includes one of fourth capability identifier information and fifth capability identifier information.

The fourth capability identifier information has a mapped terminal capability, and the fifth capability identifier information has no mapped terminal capability.

When the communications device 1500 is the fourth communications device in the foregoing method embodiment, the following steps are implemented when the computer program 15011 is executed by the processor 1502:

obtaining second information, where the second information includes one of fourth capability identifier information and fifth capability identifier information; and sending second related information of a terminal capability based on the second information.

The fourth capability identifier information has a mapped terminal capability, and the fifth capability identifier information has no mapped terminal capability.

Optionally, the second related information of the terminal capability includes at least one of the following: capability identifier information and the terminal capability.

Optionally, the second related information of the terminal capability includes:

the fourth capability identifier information; and/or the fifth capability identifier information and a terminal capability to which the fifth capability identifier information is mapped.

Optionally, at least one of the following is included:

when a first condition is met, the second related information of the terminal capability includes the first capability identifier information and a terminal capability to which the first capability identifier information is mapped, and the first condition includes at least one of the following: the first capability identifier information does not belong to the fourth capability identifier information, and the first capability identifier information belongs to the fifth capability identifier information;

when a second condition is met, the second related information of the terminal capability includes the first capability identifier information, and the second condition includes at least one of the following: the first capability identifier information belongs to the fourth capability identifier information, and the first capability identifier information does not belong to the fifth capability identifier information; and when a third condition is met, the second related information of the terminal capability includes third capability identifier information, second capability identifier information, and a terminal capability to which the second capability identifier information is mapped, and the third condition includes at least one of the following: the third capability identifier information belongs to the fourth capability identifier information, the third capability identifier information does not belong to the fifth capability identifier information, the second capability identifier information does not belong to the fourth capability identifier information, and the second capability identifier information belongs to the fifth capability identifier information; where the second capability identifier information and the third capability identifier information belong to the first capability identifier information.

The communications device 1500 can implement processes implemented by the communications device in the foregoing method embodiments. To avoid repetition, details are not described herein again.

An embodiment of the present disclosure further provides a computer-readable storage medium. A computer program is stored in the computer-readable storage medium. When being executed by a processor, the computer program implements each process of the foregoing capability management method embodiments, and a same technical effect can be achieved. To avoid repetition, details are not described herein. The computer-readable storage medium includes a read-only memory (Read-Only Memory, ROM for short), a random access memory (Random Access Memory, RAM for short), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure. The hardware includes but is not limited to an electronic circuit, an application-specific integrated circuit, a programmable logic device, a programmable processor, and the like.

The embodiments of the present disclosure are described with reference to the accompanying drawings. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

The invention claimed is:

1. A capability management method, applied to a first communications device, and comprising:
   receiving terminal capability request information, wherein the terminal capability request information comprises first indication information used to indicate a requested terminal capability; and
   sending first related information of the terminal capability according to the first indication information;
   wherein the first indication information comprises at least one of the following: first capability identifier information, second capability identifier information, third capability identifier information, second indication information used to indicate that there is no terminal capability information, or a null value used to indicate that there is no terminal capability information; wherein
   the second capability identifier information is capability identifier information with no mapped terminal capability in the first capability identifier information, and the third capability identifier information is capability identifier information with a mapped terminal capability in the first capability identifier information.

2. The method according to claim 1, wherein the first related information of the terminal capability comprises at least one of the following: a terminal capability to which first capability identifier information is mapped, a terminal capability to which second capability identifier information is mapped, or a terminal capability of a terminal.

3. The method according to claim 2, wherein the first related information of the terminal capability further comprises at least one of the following: the first capability identifier information, the second capability identifier information, or capability identifier information to which the terminal capability of the terminal is mapped.

4. The method according to claim 1, wherein
   when the first indication information comprises the first capability identifier information, the first related information of the terminal capability comprises at least one of the following: a terminal capability to which the first capability identifier information is mapped or the first capability identifier information; and/or
   when the first indication information comprises the first capability identifier information and the third capability identifier information, and/or the first indication information comprises the second capability identifier information, and/or the first indication information comprises the third capability identifier information, the first related information of the terminal capability comprises at least a terminal capability to which the second capability identifier information is mapped and the second capability identifier information; and/or
   when the first indication information comprises the null value and/or the second indication information, the first related information of the terminal capability comprises at least one of the following: a terminal capability of a terminal, capability identifier information to which the terminal capability of the terminal is mapped, the first capability identifier information, and a terminal capability to which the first capability identifier information is mapped.

5. A communications device, comprising a processor, a memory, and a computer program that is stored on the memory and that can run on the processor, wherein when the computer program is executed by the processor, steps of the capability management method according to claim 1 are implemented.

6. A capability management method, applied to a second communications device, and comprising:
   obtaining first information, wherein the first information comprises first capability identifier information; and
   sending terminal capability request information based on the first capability identifier information, wherein the terminal capability request information comprises first indication information used to indicate a requested terminal capability;
   wherein the first indication information comprises at least one of the following: first capability identifier information, second capability identifier information, third capability identifier information, second indication information used to indicate that there is no terminal capability information, or a null value used to indicate that there is no terminal capability information; wherein the second capability identifier information is capability identifier information with no mapped terminal capability in the first capability identifier information, and the third capability identifier information is capability identifier information with a mapped terminal capability in the first capability identifier information.

7. The method according to claim 6, wherein the sending terminal capability request information based on the first capability identifier information comprises:

sending the terminal capability request information based on the first capability identifier information when a preset condition is met; wherein the meeting the preset condition comprises at least one of the following:

there is no terminal capability to which the first capability identifier information is mapped; or there is no terminal capability to which second capability identifier information in the first capability identifier information is mapped.

8. The method according to claim 6, wherein after the sending terminal capability request information based on the first capability identifier information, the method further comprises:

receiving first related information of the terminal capability that is returned according to the first indication information.

9. A second communications device, comprising: a processor, a memory, and a computer program that is stored on the memory and that can run on the processor, wherein the computer program is executed by the processor to:

obtain first information, wherein the first information comprises first capability identifier information; and send terminal capability request information based on the first capability identifier information, wherein the terminal capability request information comprises first indication information used to indicate a requested terminal capability;

wherein the first indication information comprises at least one of the following: first capability identifier information, second capability identifier information, third capability identifier information, second indication information used to indicate that there is no terminal capability information, or a null value used to indicate that there is no terminal capability information; wherein the second capability identifier information is capability identifier information with no mapped terminal capability in the first capability identifier information, and the third capability identifier information is capability identifier information with a mapped terminal capability in the first capability identifier information.

10. The second communications device according to claim 9, wherein the computer program is executed by the processor to:

send the terminal capability request information based on the first capability identifier information when a preset condition is met; wherein the meeting the preset condition comprises at least one of the following:

there is no terminal capability to which the first capability identifier information is mapped; or there is no terminal capability to which second capability identifier information in the first capability identifier information is mapped.

11. The second communications device according to claim 9, wherein after the terminal capability request information is sent based on the first capability identifier information, the computer program is executed by the processor to:

receive first related information of the terminal capability that is returned according to the first indication information.

* * * * *